US009009528B2

(12) United States Patent
Gonion

(10) Patent No.: US 9,009,528 B2
(45) Date of Patent: *Apr. 14, 2015

(54) SCALAR READXF INSTRUCTION FOR PROCESSING VECTORS

(75) Inventor: Jeffry E. Gonion, Campbell, CA (US)

(73) Assignee: Apple Inc., Cupertino, CA (US)

( * ) Notice: Subject to any disclaimer, the term of this patent is extended or adjusted under 35 U.S.C. 154(b) by 172 days.

This patent is subject to a terminal disclaimer.

(21) Appl. No.: 13/604,414

(22) Filed: Sep. 5, 2012

(65) Prior Publication Data

US 2012/0331341 A1     Dec. 27, 2012

Related U.S. Application Data

(63) Continuation-in-part of application No. 12/873,063, filed on Aug. 31, 2010, now Pat. No. 8,271,832, which is a continuation-in-part of application No. 12/541,546, filed on Aug. 14, 2009, now Pat. No. 8,359,461.

(60) Provisional application No. 61/089,251, filed on Aug. 15, 2008.

(51) Int. Cl.
   *G06F 11/00*     (2006.01)
   *G06F 9/45*      (2006.01)
   *G06F 9/30*      (2006.01)
   *G06F 9/38*      (2006.01)

(52) U.S. Cl.
   CPC .......... *G06F 8/4441* (2013.01); *G06F 9/30036* (2013.01); *G06F 9/30072* (2013.01); *G06F 9/3865* (2013.01)

(58) Field of Classification Search
   CPC . G06F 11/07; G06F 11/0703; G06F 11/0706; G06F 11/0721; G06F 11/0751; G06F 11/0793; G06F 11/18; G06F 11/3024
   USPC ............... 714/2, 3, 10, 11, 19, 20, 21, 35, 49; 712/2, 5, 7, 224
   See application file for complete search history.

(56) References Cited

U.S. PATENT DOCUMENTS

| 5,113,521 | A | * | 5/1992 | McKeen et al. ................. 714/15 |
| 5,381,536 | A |   | 1/1995 | Phelps |
| 5,598,574 | A | * | 1/1997 | Yoshinaga et al. ................ 712/2 |
| 5,781,752 | A |   | 7/1998 | Moshovos |
| 5,953,241 | A |   | 9/1999 | Hansen |
| 6,115,808 | A |   | 9/2000 | Arora |
| 6,295,599 | B1 |  | 9/2001 | Hansen |
| 6,308,250 | B1 |  | 10/2001 | Klausler |
| 6,584,482 | B1 |  | 6/2003 | Hansen |

(Continued)

*Primary Examiner* — Joseph D Manoskey
(74) *Attorney, Agent, or Firm* — Park, Vaughan, Fleming & Dowler LLP

(57) ABSTRACT

The described embodiments include a processor that handles faults. The processor first receives an input vector, a control vector, and a predicate vector, each vector comprising a plurality of elements. Then, for a first element of the input vector for which corresponding elements of the control vector and the predicate vector are active, the processor performs a scalar read operation using an address from the element of the input vector. When a fault condition is encountered while performing the read operation, the processor determines if the element is a first element where a corresponding element of the control vector is active. If so (i.e., if the element is a first element where a corresponding element of the control vector is active), the processor processes the fault. Otherwise, the processor masks the fault for the element.

24 Claims, 5 Drawing Sheets

(56) References Cited

U.S. PATENT DOCUMENTS

| | | |
|---|---|---|
| 6,643,765 B1 | 11/2003 | Hansen |
| 6,725,356 B2 | 4/2004 | Hansen |
| 7,213,131 B2 | 5/2007 | Hansen |
| 7,216,217 B2 | 5/2007 | Hansen |
| 7,260,708 B2 | 8/2007 | Hansen |
| 7,301,541 B2 | 11/2007 | Hansen |
| 7,353,367 B2 | 4/2008 | Hansen |
| 7,430,655 B2 | 9/2008 | Hansen |
| 7,464,252 B2 | 12/2008 | Hansen |
| 7,509,366 B2 | 3/2009 | Hansen |
| 7,516,308 B2 | 4/2009 | Hansen |
| 7,653,806 B2 | 1/2010 | Hansen |
| 7,660,972 B2 | 2/2010 | Hansen |
| 7,660,973 B2 | 2/2010 | Hansen |
| 7,730,287 B2 | 6/2010 | Hansen |
| 2004/0068642 A1* | 4/2004 | Tanaka et al. ............ 712/223 |
| 2007/0118720 A1* | 5/2007 | Espasa et al. ............ 712/5 |
| 2008/0016320 A1* | 1/2008 | Menon et al. ............ 712/22 |
| 2008/0082785 A1* | 4/2008 | Jourdan et al. ............ 712/5 |
| 2010/0115233 A1* | 5/2010 | Brewer et al. ............ 712/7 |
| 2010/0312988 A1* | 12/2010 | Bjorklund et al. ............ 712/3 |

* cited by examiner

SCALAR READXF INSTRUCTION FOR PROCESSING VECTORS

RELATED APPLICATIONS

This application is a continuation in part of, and hereby claims priority under 35 U.S.C. §120 to, pending U.S. patent application Ser. No. 12/873,063, entitled "Non-Faulting and First-Faulting Instructions for Processing Vectors," by inventor Jeff Gonion and Keith E. Diefendorff, filed 31 Aug. 2010. This application is also a continuation in part of, and hereby claims priority under 35 U.S.C. §120 to, pending U.S. patent application Ser. No. 12/541,546, entitled "Running-Shift Instructions for Processing Vectors," by inventors Jeffry E. Gonion and Keith E. Diefendorff, filed 14 Aug. 2009. This application further claims priority under 35 U.S.C. §120 to U.S. provisional patent application No. 61/089,251, entitled "Macroscalar Processor Architecture," by inventor Jeffry E. Gonion, filed 15 Aug. 2008, to which the parent application Ser. Nos. 12/541,546 and 12/873,063 also claim priority. These applications are each herein incorporated by reference.

This application is related to: (1) pending application Ser. No. 12/419,629, entitled "Method and Apparatus for Executing Program Code," by inventors Jeffry E. Gonion and Keith E. Diefendorff, filed on 7 Apr. 2009; (2) pending application Ser. No. 12/419,644, entitled "Break, Pre-Break, and Remaining Instructions for Processing Vectors," by inventors Jeffry E. Gonion and Keith E. Diefendorff, filed on 7 Apr. 2009; (3) pending application Ser. No. 12/419,661, entitled "Check-Hazard Instructions for Processing Vectors," by inventors Jeffry E. Gonion and Keith E. Diefendorff, filed on 7 Apr. 2009; (4) pending application Ser. No. 12/495,656, entitled "Copy-Propagate, Propagate-Post, and Propagate-Prior Instructions For Processing Vectors," by inventors Jeffry E. Gonion and Keith E. Diefendorff, filed on 30 Jun. 2009; (5) pending application Ser. No. 12/495,643, entitled "Shift-In-Right Instructions for Processing Vectors," by inventors Jeffry E. Gonion and Keith E. Diefendorff, filed on 30 Jun. 2009; (6) pending application Ser. No. 12/495,631, entitled "Increment-Propagate and Decrement-Propagate Instructions for Processing Vectors," by inventors Jeffry E. Gonion and Keith E. Diefendorff, filed on 30 Jun. 2009; (7) pending application Ser. No. 12/541,505, entitled "Running-Sum Instructions for Processing Vectors," by inventors Jeffry E. Gonion and Keith E. Diefendorff, filed on 14 Aug. 2009; and (8) pending application Ser. No. 12/541,526, entitled "Running-AND, Running-OR, Running-XOR, and Running-Multiply Instructions for Processing Vectors" by inventors Jeffry E. Gonion and Keith E. Diefendorff, filed on 14 Aug. 2009.

This application is also related to: (1) pending application Ser. No. 12/873,043, entitled "Running-Min and Running-Max Instructions for Processing Vectors," by inventors Jeffry E. Gonion and Keith E. Diefendorff, filed 31 Aug. 2010; (2) pending application Ser. No. 12/873,063, entitled "Non-Faulting and First-Faulting Instructions for Processing Vectors," by inventors Jeffry E. Gonion and Keith E. Diefendorff, filed 31 Aug. 2010; (3) pending application Ser. No. 12/873,074, entitled "Vector Test Instruction for Processing Vectors" by inventors Jeffry E. Gonion and Keith E. Diefendorff, filed 31 Aug. 2010; (4) pending application Ser. No. 12/907,471, entitled "Select First and Select Last Instructions for Processing Vectors," by inventors Jeffry E. Gonion and Keith E. Diefendorff, filed 19 Oct. 2010; (5) pending application Ser. No. 12/907,490, entitled "Actual Instruction and Actual-Fault Instructions for Processing Vectors," by inventors Jeffry E. Gonion and Keith E. Diefendorff, filed 19 Oct. 2010; (6) pending application Ser. No. 12/977,333, entitled "Remaining Instruction for Processing Vectors," by inventors Jeffry E. Gonion and Keith E. Diefendorff, filed 23 Dec. 2010; (7) pending application Ser. No. 13/006,243, entitled "Remaining Instruction for Processing Vectors," by inventors Jeffry E. Gonion and Keith E. Diefendorff, filed 13 Jan. 2011; (8) pending application Ser. No. 13/189,140, entitled "GetFirst and AssignLast Instructions for Processing Vectors," by inventors Jeffry E. Gonion and Keith E. Diefendorff, filed 22 Jul. 2011; (9) pending application Ser. No. 13/291,931, entitled "Vector Index Instruction for Processing Vectors," by inventor Jeffry E. Gonion and Kieth E. Diefendorff, filed 8 Nov. 2011; (10) pending application Ser. No. 13/343,619, entitled "Predicate Count and Segment Count Instructions for Processing Vectors" by inventor Jeffry E. Gonion, filed on 4 Jan. 2012; (11) pending application Ser. No. 13/414,606, entitled "Predicting Branches for Vector Partitioning Loops when Processing Vector Instructions" by inventor Jeffry E. Gonion, filed on 7 Mar. 2012; (12) pending application Ser. No. 13/456,371, entitled "Running Unary Operation Instructions for Processing Vectors" by inventor Jeffry E. Gonion, filed on 26 Apr. 2012; (13) pending application Ser. No. 13/463,454, entitled "Running Multiply Accumulate Instruction for Processing Vectors" by inventor Jeffry E. Gonion, filed on 3 May 2012; (14) pending application Ser. No. 13/479,097, entitled "Confirm Instruction for Processing Vectors" by inventor Jeffry E. Gonion, filed on 23 May 2012; (15) pending application Ser. No. 13/484,666, entitled "Conditional Extract Instruction for Processing Vectors" by inventor Jeffry E. Gonion, filed on 31 May 2012; (16) pending application Ser. No. 13/484,079, entitled "Value Check Instruction for Processing Vectors" by inventor Jeffry E. Gonion, filed on 31 May 2012; and (17) pending application Ser. No. 13/552,447, entitled "Read XF Instruction for Processing Vectors" by inventor Jeffry E. Gonion, filed on 18 Jul. 2012.

This application is also related to: (1) pending application Ser. No. 12/237,212, entitled "Conditional Data-Dependency Resolution in Vector Processors," by inventors Jeffry E. Gonion and Keith E. Diefendorff, filed 24 Sep. 2008; (2) pending application Ser. No. 12/237,196, entitled "Generating Stop Indicators Based on Conditional Data Dependency in Vector Processors," by inventors Jeffry E. Gonion and Keith E. Diefendorff, filed 24 Sep. 2008; (3) pending application Ser. No. 12/237,190, entitled "Generating Predicate Values Based on Conditional Data Dependency in Vector Processors," by inventors Jeffry E. Gonion and Keith E. Diefendorff, filed 24 Sep. 2008; (4) application Ser. No. 11/803,576, entitled "Memory-Hazard Detection and Avoidance Instructions for Vector Processing," by inventors Jeffry E. Gonion and Keith E. Diefendorff, filed 14 May 2007, which has been issued as U.S. Pat. No. 8,019,976; and (5) pending application Ser. No. 13/224,170, entitled "Memory-Hazard Detection and Avoidance Instructions for Vector Processing," by inventors Jeffry E. Gonion and Keith E. Diefendorff, filed 14 May 2007.

BACKGROUND

1. Field

The described embodiments relate to techniques for improving the performance of computer systems. More specifically, the described embodiments relate to a SReadXF instruction for processing vectors.

2. Related Art

Recent advances in processor design have led to the development of a number of different processor architectures. For example, processor designers have created superscalar processors that exploit instruction-level parallelism (ILP), multi-core processors that exploit thread-level parallelism (TLP), and vector processors that exploit data-level parallelism (DLP). Each of these processor architectures has unique advantages and disadvantages which have either encouraged or hampered the widespread adoption of the architecture. For example, because ILP processors can often operate on existing program code that has undergone only minor modifications, these processors have achieved widespread adoption. However, TLP and DLP processors typically require applications to be manually re-coded to gain the benefit of the parallelism that they offer, a process that requires extensive effort. Consequently, TLP and DLP processors have not gained widespread adoption for general-purpose applications.

One significant issue affecting the adoption of DLP processors is the vectorization of loops in program code. In a typical program, a large portion of execution time is spent in loops. Unfortunately, many of these loops have characteristics that render them unvectorizable in existing DLP processors. Thus, the performance benefits gained from attempting to vectorize program code can be limited.

One significant obstacle to vectorizing loops in program code in existing systems is dependencies between iterations of the loop. For example, loop-carried data dependencies and memory-address aliasing are two such dependencies. These dependencies can be identified by a compiler during the compiler's static analysis of program code, but they cannot be completely resolved until runtime data is available. Thus, because the compiler cannot conclusively determine that runtime dependencies will not be encountered, the compiler cannot vectorize the loop. Hence, because existing systems require that the compiler determine the extent of available parallelism during compilation, relatively little code can be vectorized.

SUMMARY

The described embodiments include a processor that handles faults. The processor first receives an input vector, a control vector, and a predicate vector, each vector comprising a plurality of elements. Then, for a first element of the input vector for which corresponding elements of the control vector and the predicate vector are active, the processor performs a scalar read operation using an address from the element of the input vector. When a fault condition is encountered while performing the read operation, the processor determines if the element is a first element where a corresponding element of the control vector is active. If so (i.e., if the element is a first element where a corresponding element of the control vector is active), the processor processes the fault. Otherwise, the processor masks the fault for the element.

In some embodiments, when masking the fault for the element, the processor ignores the fault condition that was encountered while performing the read operation using the address from the element.

In some embodiments, when the fault is masked, the processor stores a substitute value into a result register. In addition, when no fault condition is encountered while performing the read operation, the processor stores a result of the read operation into the result register.

In some embodiments, when masking the fault, the processor clears at least one corresponding bit position in a fault-status register (FSR) to indicate that the fault was masked. In some of these embodiments, clearing at least one corresponding bit position in the FSR comprises clearing bit positions at and after a corresponding bit position in the FSR.

In some embodiments, when a fault has been masked, the processor sets a processor status flag to indicate that the fault has been masked.

In some embodiments, the input vector comprises one of an address or an address pointer in each element.

In some embodiments, processing the fault comprises generating an exception.

BRIEF DESCRIPTION OF THE FIGURES

In the figures, like reference numerals refer to the same figure elements.

DETAILED DESCRIPTION

Figure 1:
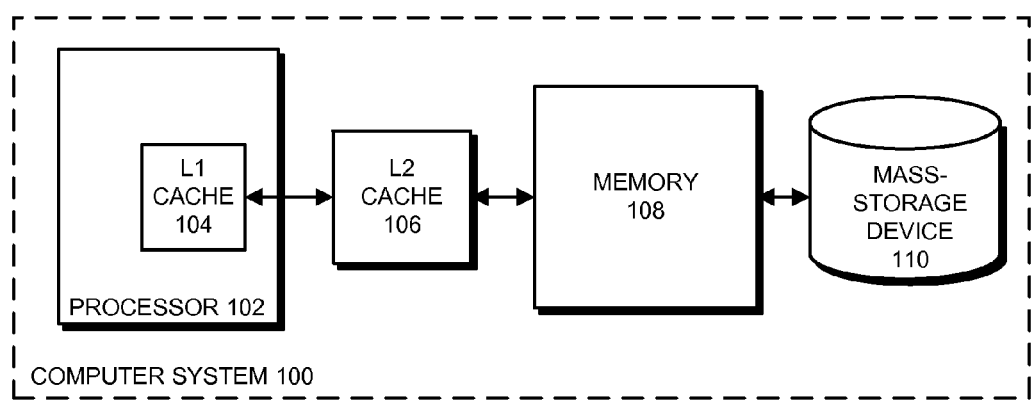
FIG. 1 presents a block diagram of a computer system in accordance with the described embodiments.

The following description is presented to enable any person skilled in the art to make and use the described embodiments, and is provided in the context of a particular application and its requirements. Various modifications to the described embodiments will be readily apparent to those skilled in the art, and the general principles defined herein may be applied to other embodiments and applications without departing from the spirit and scope of the described embodiments. Thus, the described embodiments are not limited to the embodiments shown, but are to be accorded the widest scope consistent with the principles and features disclosed herein.

In the described embodiments, an electronic device with computing capabilities (e.g., computer system 100 in FIG. 1) can use code and/or data stored on a computer-readable storage medium to perform some or all of the operations herein described. More specifically, the electronic device can read the code and/or data from the computer-readable storage medium and can execute the code and/or use the data when performing the described operations. A computer-readable storage medium can be any device or medium that can store code and/or data for use by such an electronic device. For example, the computer-readable storage medium can include, but is not limited to, volatile memory or non-volatile memory, including flash memory, random access memory (RAM, SRAM, DRAM, RDRAM, DDR/DDR2/DDR3 SDRAM, etc.), read-only memory (ROM), magnetic or optical storage mediums (e.g., disk drives, magnetic tape, CDs, DVDs), or other computer-readable mediums capable of storing data structures or code. In the described embodiments, the computer-readable storage medium does not include non-statutory computer-readable storage mediums such as transitory signals.

In the described embodiments, one or more hardware modules can be configured to perform the operations herein described. For example, the hardware modules can comprise, but are not limited to, one or more processors/processor cores, application-specific integrated circuit (ASIC) chips, field-programmable gate arrays (FPGAs), and/or other programmable-logic devices. When the hardware modules are activated, the hardware modules can perform some or all of the described operations. In some embodiments, the hardware modules include one or more general-purpose circuits that are configured by executing instructions (program code, firmware, etc.) to perform the operations.

In the following, "some embodiments" describes a subset of all of the possible embodiments, but does not always specify the same subset of the embodiments.

Macroscalar Architecture

The embodiments described herein are based in part on the Macroscalar Architecture that is described in U.S. patent application Ser. No. 12/873,063, entitled "Non-Faulting and First-Faulting Instructions for Processing Vectors," by inventor Jeff Gonion, filed 31 Aug. 2010, and U.S. patent application Ser. No. 12/541,546, entitled "Running-Shift Instructions for Processing Vectors," by inventors Jeffry E. Gonion and Keith E. Diefendorff, filed 14 Aug. 2009, (hereinafter, "the '063 and '546 applications"), the contents of which are (as described above) incorporated by reference.

As recited in the '063 and '546 applications, the described embodiments provide an instruction set and supporting hardware that allow compilers to generate program code for loops without completely determining parallelism at compile-time, and without discarding useful static analysis information. Specifically, these embodiments provide a set of instructions that do not mandate parallelism for loops but instead enable parallelism to be exploited at runtime if dynamic conditions permit. These embodiments thus include instructions that enable code generated by the compiler to dynamically switch between non-parallel (scalar) and parallel (vector) execution for loop iterations depending on conditions at runtime by switching the amount of parallelism used.

These embodiments provide instructions that enable an undetermined amount of vector parallelism for loop iterations but do not require that the parallelism be used at runtime. More specifically, these embodiments include a set of vector-length agnostic instructions whose effective vector length can vary depending on runtime conditions. Thus, if runtime dependencies demand non-parallel execution of the code, then execution occurs with an effective vector length of one element. Likewise, if runtime conditions permit parallel execution, the same code executes in a vector-parallel manner to whatever degree is allowed by runtime dependencies (and the vector length of the underlying hardware). For example, if two out of eight elements of the vector can safely execute in parallel, the described embodiments execute the two elements in parallel. In these embodiments, expressing program code in a vector-length agnostic format enables a broad range of vectorization opportunities that are not present in existing systems.

In the described embodiments, during compilation, a compiler first analyzes the loop structure of a given loop in program code and performs static dependency analysis. The compiler then generates program code that retains static analysis information and instructs processor 102 how to resolve runtime dependencies and process the program code with the maximum amount of parallelism possible. More specifically, the compiler provides vector instructions for performing corresponding sets of loop iterations in parallel, and provides vector-control instructions for dynamically limiting the execution of the vector instructions to prevent data dependencies between the iterations of the loop from causing an error (which can be called "vector partitioning"). This approach defers the determination of parallelism to runtime, where the information on runtime dependencies is available, thereby allowing the software and processor to adapt parallelism to dynamically changing conditions (i.e., based on data that is not available at compile-time).

Vectorized program code can comprise vector-control instructions and vector instructions forming a loop in the vectorized program code that performs vector operations based on a corresponding loop in program code. The vector control instructions can determine iterations of the loop in program code that are safe to execute in parallel (because, e.g., no runtime data dependencies have occurred), and the vector instructions can be executed using predication and/or other dynamic controls to limit the elements of the vector instruction that are processed in parallel to the determined-safe iterations. (Recall that, in the described embodiments, each element of a vector instruction can perform an operation (or operations) for corresponding iterations of a loop in the program code.)

Terminology

Throughout the description, we use the following terminology. These terms may be generally known in the art, but are described below to clarify the subsequent descriptions.

The term "active" or "active element," as used in this description to refer to one or more elements of a vector, indicates elements that are operated on during a given operation. Generally, the described embodiments enable a vector execution unit to selectively perform operations on one or more available elements in a given vector in parallel. For example, an operation can be performed on only the first two of eight elements of the vector in parallel. In this case, the first two elements are "active elements," while the remaining six elements are "inactive elements." In the described embodiments, one or more other vectors can be used to determine which elements in a given operand vector are active (i.e., are to be operated on). For example, a "predicate vector" or "control vector" can include "active" elements that are used to determine which elements in the operand vector to perform operations on. In some embodiments, elements that contain data of a predetermined type are active elements (e.g., true, false, non-zero, zero, uppercase/lowercase characters, even/odd/prime numbers, vowels, whole numbers, etc.).

The terms "true" and "false" are used in this description to refer to data values (e.g., a data value contained in an element in a vector). Generally, in computer systems true and false are often represented by 1 and 0, respectively. In practice, a given embodiment could use any value to represent true and false, such as the number 55, or the letter "T."

In the following examples, "corresponding elements" may be described. Generally, corresponding elements are elements at a same element position in two or more different vectors. For example, when a value is copied from an element in an input vector into a "corresponding element" of a result vector, the value is copied from an nth element in the input vector into an nth element in the result vector.

In the following examples, "relevant" elements may be described. In the described embodiments, a relevant element is an element in a given vector for which the corresponding element in one or more other vectors (e.g., a control vector and/or predicate vector) is/are active. For example, given an input control vector for which only a fourth element is active, a second input vector only has one relevant element—the fourth element.

In this description, for clarity, operations performed for "vector instructions and/or operations" may be described generally as operations performed for "vector instructions," however, in the described embodiments "vector operations" can be handled in similar ways.

In this description, an element position (i.e., the location of a given element in one or more vectors) can be described as a "first" element position where a given condition is true (e.g., wherein an element of one or more vectors are active). Generally, a "first" element position is an element position with a lowest element number. For example, assuming that the elements in the input vector are numbered 0-N from left to right, the first element position where a condition occurs is the leftmost element position. In contrast, the first element is the rightmost element position when the elements are numbered 0-N from right to left. Additionally, a "last" element position is an element position with a highest element number.

Notation

In describing the embodiments in the instant application, we use the following formats for variables, which are vector quantities unless otherwise noted:

$p5=a<b;$

Elements of vector p5 are set to 0 or 1 depending on the result of the comparison operation a<b. Note that vector p5 can be a predicate vector that can be used to control the number of elements of one or more vector instructions that execute in parallel.

$\sim p5;a=b+c;$

Only elements in vector a designated by active (i.e., non-zero) elements in the predicate vector p5 receive the result of b+c. The remaining elements of a are unchanged. This operation is called "predication," and is denoted using the tilde ("~") before the predicate vector.

$!p5;a=b+c;$

Only elements in vector a designated by active (e.g., non-zero) elements in the predicate vector p5 receive the result of b+c. The remaining elements of a are set to zero. This operation is called "zeroing," and is denoted using the exclamation point ("!") before the predicate vector.

--- if (FIRST( )) goto ...; Also LAST( ), ANY( ), ALL( ), CARRY( ), ABOVE( ), or NONE( ), (where ANY( ) == !NONE( ))

---

These instructions test the processor status flags and branch accordingly.

$x+=VECLEN;$

VECLEN is a value that communicates the number of elements per vector. The value is determined at runtime by the processor 102 (see FIG. 1), rather than being determined by the compiler/assembler.

//Comment

In a similar way to many common programming languages, the examples presented below use the double forward slash to indicate comments. These comments can provide information regarding the values contained in the indicated vector or explanation of operations being performed in a corresponding example.

In these examples, other C++-formatted operators retain their conventional meanings, but are applied across the vector on an element-by-element basis. Where function calls are employed, they imply a single instruction that places any value returned into a destination register. For simplicity in understanding, all vectors discussed herein are vectors of integers, but alternative embodiments support other data formats.

Instruction Definitions

The described embodiments comprise a SReadXF instruction. The SReadXF instruction takes an input vector, a predicate vector, and a control vector as inputs, each vector comprising a plurality of elements (e.g., 32, 64, 86, or another number). When executed, the SReadXF instruction causes processor 102 (see FIG. 1) to perform a scalar read operation using an address from a key element of the input vector, where the key element is a first element position where corresponding elements of both the predicate vector and the control vector are active. When a fault condition (e.g., a page fault, an illegal address, etc.) is encountered while performing the read operation, processor 102 determines if the corresponding element of the control vector is the first active element of the control vector (e.g., the first element position for which the control vector contains a non-zero value). When the corresponding element of the control vector is the first active element of the control vector, processor 102 processes the fault. For example, processor 102 can generate an exception and/or perform one or more other operations to process the fault. Otherwise, processor 102 masks the fault. For example, processor 102 can ignore the fault condition that was encountered while performing the read operation using the address from the element and can proceed with subsequent operations.

In some embodiments, when a fault is masked, processor 102 can clear a corresponding bit position and subsequent bit positions in FSR 214 (see FIG. 2) in order to record the element in the first input vector where a fault was encountered. Clearing the bit positions of FSR 214 in this way enables processor 102 to maintain a record of elements that may be effected by a faulting read. Subsequent operations in processor 102 can read FSR 214 to determine elements for which faults were masked.

Although certain arrangements of instructions are used in describing the SReadXF instruction, a person of skill in the art will recognize that these concepts may be implemented using different arrangements or types of instructions without departing from the spirit of the described embodiments. Additionally, the SReadXF instruction is described using a signed-integer data type. However, in alternative embodiments, other data types or formats are used.

In the example below, the BadAddr function is an exemplary function that causes processor 102 to determine if the address is "bad" (e.g., if a check of the page table for an input address returns a fault, if the address is illegal/malformed/etc., or if the address is bad for another reason). If so, the BadAddr function returns True. Although this example is presented to illustrate a portion of the operations performed by the SReadXF instruction, in some embodiments, processor 102 does not use the BadAddr function. Instead, a read operation that uses the address in the element of an input vector for which corresponding elements of the predicate vector and control vector are active is simply forwarded to a cache or another memory in the memory hierarchy for processor 102, and processor 102 automatically handles faults arising from the reads so that the outcome is the same as the outcome reached by performing the operations described below. Note that automatically handling faults can comprise masking the fault and clearing a corresponding bit and any subsequent bits in FSR 214, or processing the fault. The same is true for the Read and ProcessFault functions shown below; these exemplary functions are simply illustrative of an underlying operation of the SReadXF instruction and may not be used in some embodiments.

For the purposes of explanation, the vector data type is defined as a C++ class containing an array v[ ] of elements that comprise the vector. Within these descriptions, the variable VECLEN indicates the size of the vector. In some embodiments, VECLEN is constant.

Note that the format of the following instruction definitions is a statement of the instruction type followed by a description of the instruction that can include example code as well as one or more usage examples.

SReadXF

The SReadXF instruction causes processor 102 to perform a read operation using an address from a first element position of an input vector where both a corresponding element of a predicate vector and a control vector are active. When a fault condition is encountered during the read operation, processor 102 determines if the corresponding element of the control vector is the first active element of the control vector. If the corresponding element of the control vector is the first active element of the control vector, processor 102 processes the fault. Otherwise, processor 102 masks the fault.

In the described embodiments, processor 102 can clear a bit position in FSR 214 (i.e., set the bit position to zero) to indicate that a fault has been masked for a given element or a preceding element. In some embodiments, processor 102 automatically clears a given bit position of FSR 214 and any subsequent bit positions when a fault condition has been encountered (with exception of the key element position, as described above) when performing a read using an address from a corresponding position of the input vector. Processor 102 can also set processor flags ("none") to indicate when no fault conditions were encountered.

```
int SReadXF(vector gp, vector ctrl, vector src)
{
    int x, y, r, bad = 0, r = 0, first = 1;
    for (x=0; x<VECLEN; ++x)
    {
        if (gp.v[x] && ctrl.v[x])
        {
            bad = BadAddr(src.v[x]);
            if (bad)
            {
                if(bad && first)
                {
                    ProcessFault(src.v[x]]);
                }
                else
                {
                    r = 0;
                    for (y=x; y<VECLEN; ++y)
                    {
                        FSR[y]=0;
                    }
                    break;
                }
            }
            else
            {
                r = Read(src.v[x]);
                break;
            }
        }
        if(ctrl.v[x])
        {
            first = 0;
        }
    }
    SetNone(!bad);
    return (r);
}
```

EXAMPLE

| r = SReadXF(gp, ctrl, src) | | | | | | | | | | |
|---|---|---|---|---|---|---|---|---|---|---|
| On Entry: | FSR | = { | 1 | 1 | 1 | 1 | 1 | 1 | 1 | 1 } |
| | ctrl | = { | 0 | 0 | 1 | 1 | 1 | 1 | 1 | 1 } |
| | gp | = { | 0 | 0 | 0 | 1 | 1 | 1 | 1 | 0 } |
| | src | = { | 1 | 2 | 3 | 4 | 5 | 6 | 7 | 8 } |
| Bad address? | | = | N | N | N | N | Y | Y | Y | Y |
| On Exit: | r | = Mem[4] | | | | | | | | |

In the preceding example, N=no (address not bad), Y=yes (address bad), Mem[4]=data read from memory address 4, and representative numbers 1-8 are used as exemplary "addresses" in src, although actual addresses may be formatted differently.

Computer System

FIG. 1 presents a block diagram of a computer system 100 in accordance with the described embodiments. Computer system 100 includes processor 102, L2 cache 106, memory 108, and mass-storage device 110. Processor 102 includes L1 cache 104.

Processor 102 can be a general-purpose processor that performs computational operations. For example, processor 102 can be a central processing unit (CPU) such as a microprocessor, a controller, an application-specific integrated circuit (ASIC), or a field-programmable gate array (FPGA). In the described embodiments, processor 102 has one or more mechanisms for vector processing (i.e., vector execution units).

Mass-storage device 110, memory 108, L2 cache 106, and L1 cache 104 are computer-readable storage devices that collectively form a memory hierarchy that stores data and instructions for processor 102. Generally, mass-storage device 110 is a high-capacity, non-volatile memory, such as a disk drive or a large flash memory, with a large access time, while L1 cache 104, L2 cache 106, and memory 108 are smaller, faster semiconductor memories that store copies of frequently used data. Memory 108 is typically a dynamic random access memory (DRAM) structure that is larger than L1 cache 104 and L2 cache 106, whereas L1 cache 104 and L2 cache 106 are typically comprised of smaller static random access memories (SRAM). In some embodiments, L2 cache 106, memory 108, and mass-storage device 110 are shared between one or more processors in computer system 100. Such memory structures are well-known in the art and are therefore not described in more detail.

In some embodiments, the devices in the memory hierarchy (i.e., L1 cache 104, etc.) can access (i.e., read and/or write) multiple cache lines per cycle. These embodiments enable more effective processing of memory accesses that occur based on a vector of pointers or array indices to non-contiguous memory addresses. In addition, in some embodiments, the caches in the memory hierarchy are divided into a number of separate banks, each of which can be accessed in parallel. Banks within caches and parallel accesses of the banks are known in the art and hence are not described in more detail.

Computer system 100 can be or can be incorporated into many different types of electronic devices. For example, computer system 100 can be incorporated in or can be a desktop computer, a laptop computer, a tablet computer, a server, a media player, an appliance, a cellular phone, a piece of testing equipment, a network appliance, a personal digital assistant (PDA), a hybrid device (e.g., a "smart phone"), or another electronic device.

Although we use specific components to describe computer system 100, in alternative embodiments, different components may be present in computer system 100. For example, computer system 100 may not include some of the memory hierarchy (e.g., memory 108 and/or mass-storage device 110). Alternatively, computer system 100 may include video cards, video-capture devices, user-interface devices, network cards, optical drives, and/or other peripheral devices that are coupled to processor 102 using a bus, a network, or another suitable communication channel. Computer system 100 may also include one or more additional processors, wherein the processors share some or all of L2 cache 106, memory 108, and mass-storage device 110.

Processor

Figure 2:
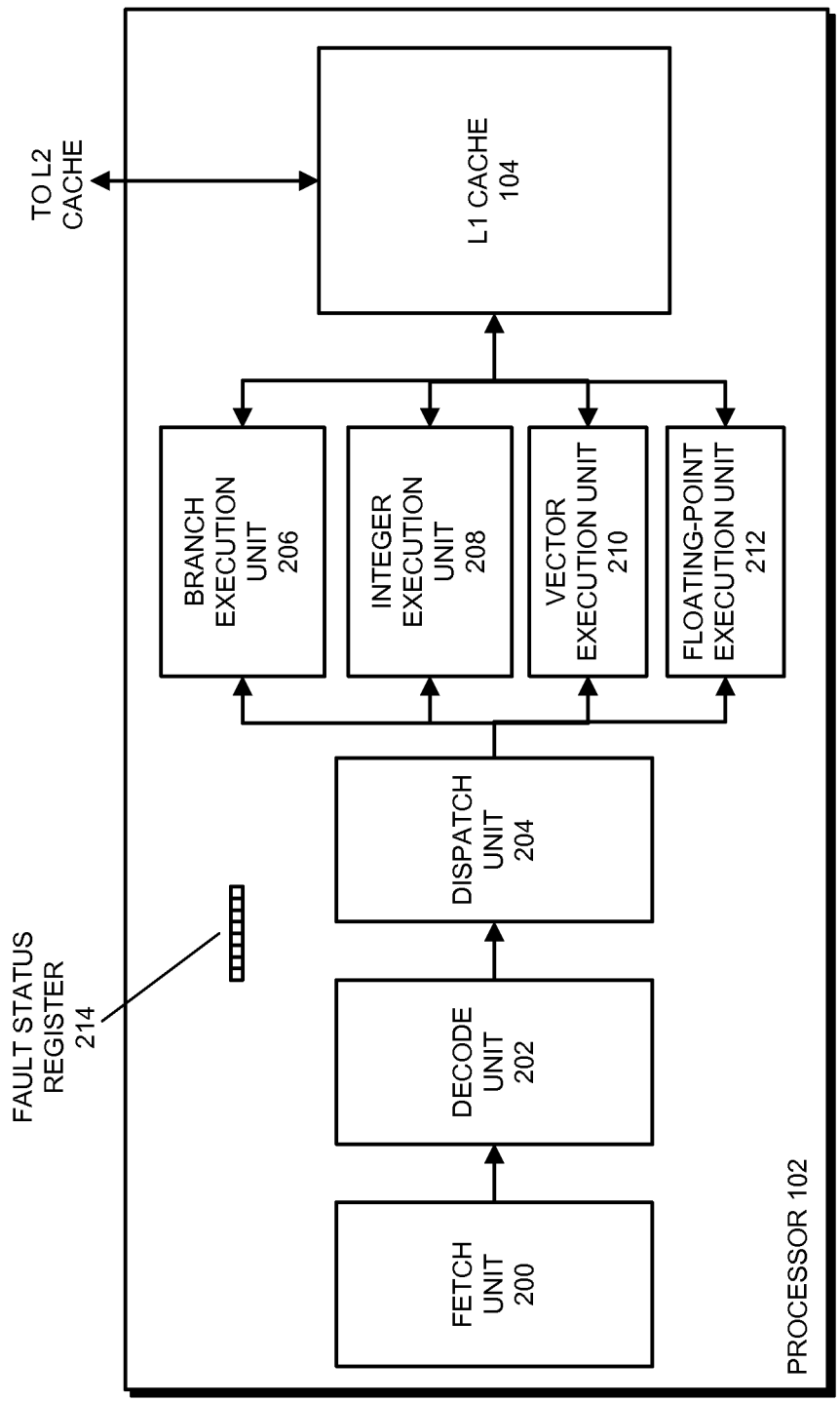
FIG. 2 presents an expanded view of a processor in accordance with the described embodiments.

FIG. 2 presents an expanded view of processor 102 in accordance with the described embodiments. As shown in FIG. 2, processor 102 includes L1 cache 104, fetch unit 200, decode unit 202, dispatch unit 204, branch execution unit 206, integer execution unit 208, vector execution unit 210, floating-point execution unit 212 (branch execution unit 206, integer execution unit 208, vector execution unit 210, and floating-point execution unit 212 as a group are interchangeably referred to as "the execution units"). Processor 102 also includes fault status register (FSR) 214.

Fetch unit 200 fetches instructions from the memory hierarchy in computer system 100 and forwards the fetched instructions to be decoded in decode unit 202 for eventual execution in the execution units. Generally, fetch unit 200 attempts to fetch instructions from the closest portion of the memory hierarchy first, and if the instruction is not found at that level of the memory hierarchy, proceeds to the next level in the memory hierarchy until the instruction is found. For example, in some embodiments, fetch unit can request instructions from L1 cache 104 (which can comprise a single physical cache for instructions and data, or can comprise physically separate instruction and data caches). Aside from the operations herein described, the operations of fetch units are generally known in the art and hence are not described in more detail.

Decode unit 202 decodes the instructions and assembles executable instructions to be sent to the execution units, and dispatch unit 204 receives decoded instructions from decode unit 202 and dispatches the decoded instructions to the appropriate execution unit. For example, dispatch unit 204 can dispatch branch instructions to branch execution unit 206, integer instructions to integer execution unit 208, etc.

Each of execution units 206-212 is used for performing computational operations, such as logical operations, mathematical operations, or bitwise operations for an associated type of operand or operation. More specifically, integer execution unit 208 is used for performing computational operations that involve integer operands, floating-point execution unit 212 is used for performing computational operations that involve floating-point operands, vector execution unit 210 is used for performing computational operations that involve vector operands, and branch execution unit 206 is used for performing operations for resolving branches. Integer execution units, branch execution units, and floating-point execution units are generally known in the art and are not described in detail.

Figure 3:
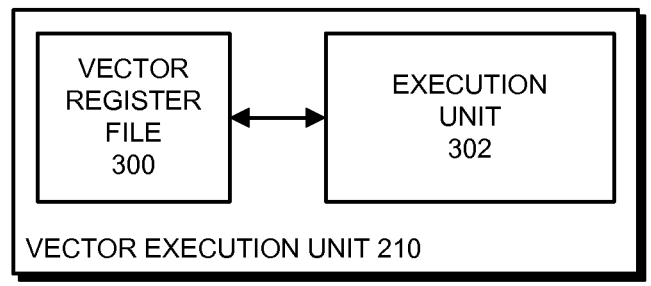
FIG. 3 presents an expanded view of a vector execution unit in accordance with the described embodiments.

In the described embodiments, vector execution unit 210 is a single-instruction-multiple-data (SIMD) execution unit that performs operations in parallel on some or all of the data elements that are included in vectors of operands. FIG. 3 presents an expanded view of vector execution unit 210 in accordance with the described embodiments. As is shown in FIG. 3, vector execution unit 210 includes a vector register file 300 and an execution unit 302. Vector register file 300 includes a set of vector registers that can hold operand vectors and result vectors for execution unit 302. In some embodiments, there are 32 vector registers in the vector register file, and each register includes 128 bits. In alternative embodiments, there are different numbers of vector registers and/or different numbers of bits per register.

Vector execution unit 302 retrieves operands from registers in vector register file 300 and executes vector instructions that cause execution unit 302 to perform operations in parallel on some or all of the data elements (or, simply, "elements") in the operand vector. For example, execution unit 302 can perform logical operations, mathematical operations, or bitwise operations on the elements in the vector. Execution unit 302 can perform one vector operation per cycle (although the "cycle" may include more than one cycle of a clock used to trigger, synchronize, and/or control execution unit 302's computational operations).

In the described embodiments, execution unit 302 supports vectors that hold N data elements (e.g., bytes, words, double-words, etc.). In these embodiments, execution unit 302 can perform operations on Nor fewer of the data elements in an operand vector in parallel. For example, assuming an embodiment where the vector is 256 bits in length (i.e., 32 bytes), the data elements being operated on are four-byte words, and the operation is adding a value to the data elements, these embodiments can add the value to any number of the eight words in the vector.

In the described embodiments, execution unit 302 includes at least one control signal that enables the dynamic limitation of the data elements in an operand vector on which execution unit 302 operates. Specifically, depending on the state of the control signal, execution unit 302 may or may not operate on all the data elements in the vector. For example, assuming an embodiment where the vector is 512 bits in length and the data elements being operated on are four-byte words, the control signal can be asserted to prevent operations from being performed on some or all of 16 data words in the operand vector. Note that "dynamically" limiting the data elements in the operand vector upon which operations are performed can involve asserting the control signal separately for each cycle at runtime.

In some embodiments, based on the values contained in a vector of predicates or one or more scalar predicates, execution unit 302 applies vector operations to selected vector data elements only. In some embodiments, the remaining data elements in a result vector remain unaffected (which we call "predication") or are forced to zero (which we call "zeroing"). In some of these embodiments, the clocks for the data element processing subsystems ("lanes") that are unused due to predication or zeroing in execution unit 302 can be gated, thereby reducing dynamic power consumption in execution unit 302.

The described embodiments are vector-length agnostic. Thus, a compiler or programmer need not have explicit knowledge of the vector length supported by the underlying hardware (e.g., vector execution unit 302). In these embodiments, a compiler generates or a programmer writes program code that need not rely on (or use) a specific vector length (some embodiments are forbidden from even specifying a specific vector size in program code). Thus, the compiled code in these embodiments (i.e., binary code) runs on other embodiments with differing vector lengths, while potentially realizing performance gains from processors that support longer vectors. Consequently, as process technology allows longer vectors, execution of legacy binary code simply speeds up without any effort by software developers.

In some embodiments, vector lengths need not be powers of two. Specifically, vectors of 3, 7, or another number of data elements can be used in the same way as vectors with power-of-two numbers of data elements.

In the described embodiments, each data element in the vector can contain an address that is used by execution unit 302 for performing a set of memory accesses in parallel. In these embodiments, if one or more elements of the vector contain invalid memory addresses, invalid memory-read operations can occur. In these embodiments, invalid memory-read operations that would otherwise result in program termination instead cause any elements with valid addresses to be read and elements with invalid elements to be flagged, allowing program execution to continue in the face of speculative, and in hindsight illegal, read operations.

In some embodiments, processor 102 (and hence execution unit 302) is able to operate on and use vectors of pointers. In these embodiments, the number of data elements per vector is the same as the number of pointers per vector, regardless of the size of the data type. Instructions that operate on memory may have variants that indicate the size of the memory access, but elements in processor registers should be the same as the pointer size. In these embodiments, processors that support both 32-bit and 64-bit addressing modes may choose to allow twice as many elements per vector in 32-bit mode, thereby achieving greater throughput. This implies a distinct throughput advantage to 32-bit addressing, assuming the same width data path. Implementation-specific techniques can be used to relax the requirement. For example, double-precision floating-point numbers can be supported in 32-bit mode through register pairing or some other specialized mechanism.

FSR 214 is a memory element that includes a number of bit positions (e.g., individual memory circuits) that can be used by processor 102 to record element positions for vector operations for which faults were masked. In the described embodiments, processor 102 supports a number of different vector instructions and/or operations that can be configured by default and/or can be overridden (e.g., using a software switch, control element, setting, etc. in processor 102) to enable processor 102 to mask (i.e., at least temporarily ignore) fault conditions encountered for at least some of the elements of the vector instruction/operation (including the herein-described SReadXF instruction). For example, the described embodiments can support fault masking for vector read instructions, vector write instructions, vector mathematical instructions, and/or other vector instructions/operations. In these embodiments, upon masking a fault for an element of a vector instruction/operation, processor 102 clears the corresponding bit position and any subsequent bit positions in FSR to indicate that the fault was masked (in some embodiments, processor 102 clears only the corresponding bit position in FSR 214). Processor 102 can then subsequently read FSR 214 to determine if at least one element of the vector instruction/operation encountered a fault condition that was masked by processor 102.

The number of bit positions/memory elements in FSR 214 is sufficient to record masked faults for the widest possible vector instruction supported in processor 102. For example, assuming that the widest vector instruction supported in processor 102 is N elements wide (where N can equal, e.g., 64, 128, 357, etc.), FSR 214 can include N bit positions/individual memory circuits. FSR 214 may also include other control mechanisms that are used when performing operations using FSR 214. For example, in some embodiments, FSR 214 can include status bits such as a valid bit that indicates that the value in FSR 214 is valid/invalid.

In some embodiments, a bit position in FSR 214 is set to zero (or "cleared") to record that a fault was masked for a corresponding vector element, and is otherwise set to 1. In alternative embodiments, a bit position can be set to another value to indicate a masked fault (e.g., 1, T, etc.). Generally, any value that can be used to indicate that a fault was masked can be used in the described embodiments.

Although we describe processor 102 as including a particular set of units, in alternative embodiments, processor 102 can include different numbers or types of units. In addition, although vector execution unit 210 is describe using particular mechanisms, alternative embodiments may include different mechanisms. Generally, vector execution unit 210 (and, more broadly, processor 102) comprises sufficient mechanisms to perform vector operations, including the operations herein described.

Executing a SReadXF Instruction

Figure 4:
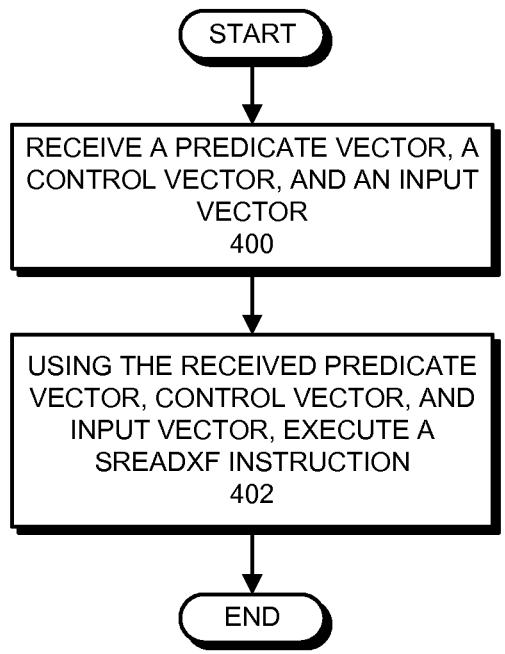
FIG. 4 presents a flowchart illustrating a process for executing program code in accordance with the described embodiments.

FIG. 4 presents a flowchart illustrating a process for executing program code in accordance with the described embodiments. As can be seen in FIG. 4, when executing program code, processor 102 receives a predicate vector, a control vector, and an input vector that each include N elements (step 400). Next, using the received predicate vector, control vector, and input vector, processor 102 executes a SReadXF instruction (step 402).

In the description of the SReadXF instruction above, exemplary functions are used to describe operations performed by the SReadXF instruction. Although the example above is presented for illustrative purposes, alternative embodiments may function differently. For example, in some embodiments, a read operation is automatically performed using an address from a first (e.g., a leftmost element when elements are numbered 0-N from left to right) element of the input vector for which a corresponding element of the predicate vector and the control vector are active. If a fault condition is encountered during the read operation, processor 102 uses active elements of the control vector (in combination with active elements of the predicate vector) to determine if the fault condition is to be handled/processed by processor 102 or masked by processor 102 (as described below).

In the following examples, "corresponding elements" of vectors and "corresponding bit positions" in FSR 214 may be described with respect to elements of other vectors. As used herein, as an example, a corresponding element of a given vector (i.e., one of the control vector, the predicate vector, or the input vector) for a bit position in FSR 214 is an nth element in the predicate vector for an nth bit position in FSR 214. As another example, a corresponding element for a given vector (i.e., one of the control vector, the predicate vector, or the input vector) for an element of another vector (i.e., one of the control vector, the predicate vector, or the input vector) is an nth element in the given vector for an nth element of the other vector.

Figure 5:
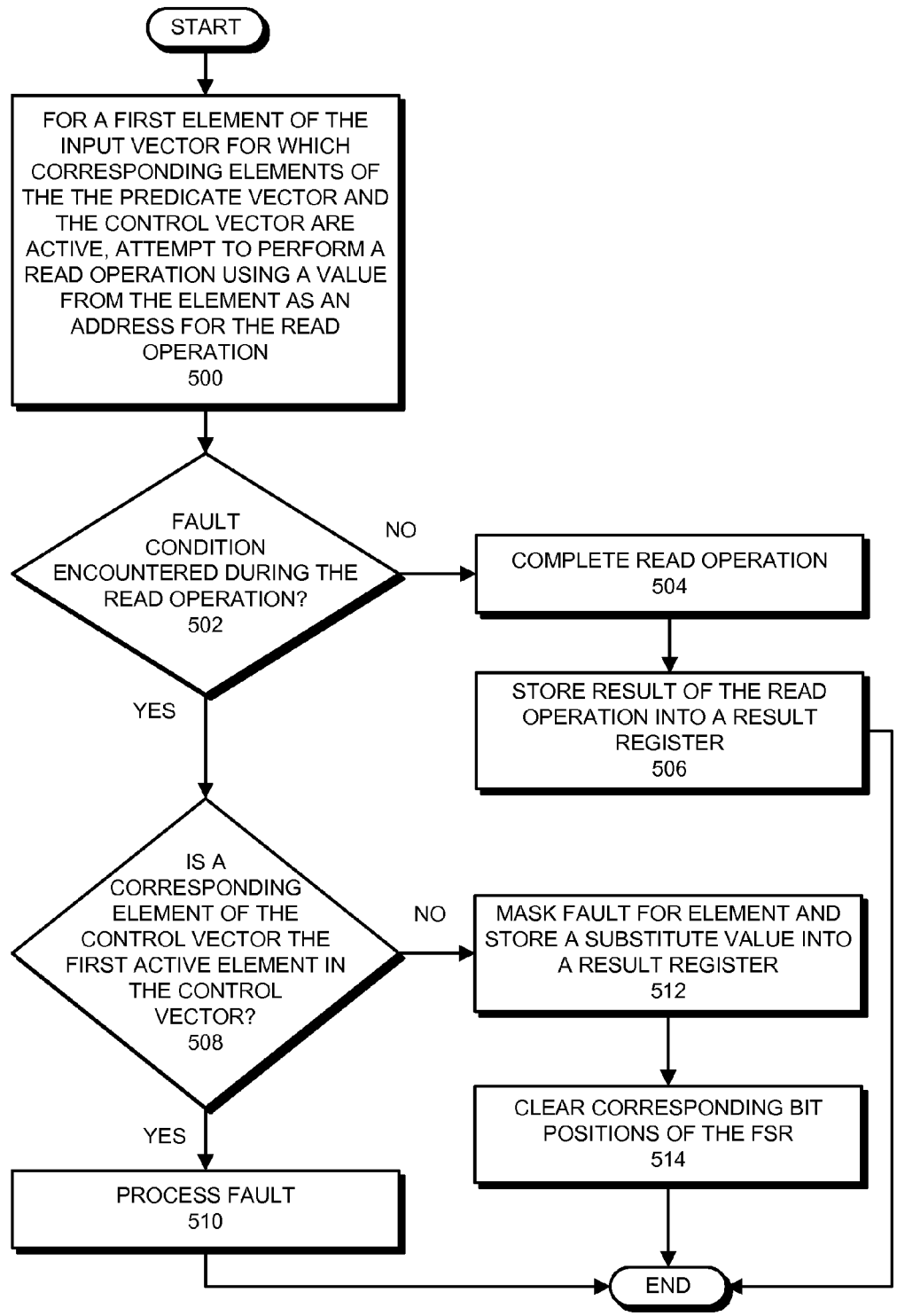
FIG. 5 presents a flowchart illustrating a process for executing a SReadXF instruction in accordance with the described embodiments.

FIG. 5 presents a flowchart illustrating a process for executing a SReadXF instruction in accordance with the described embodiments. In these embodiments, the operations shown in FIG. 5 are performed as part of step 402 in FIG. 4. Thus, for the purposes of describing the operations shown in FIG. 5, the predicate vector, the control vector, and the input vector are assumed to have been received, as shown in step 400 in FIG. 4.

When executing the SReadXF instruction, processor 102 first attempts to perform a read operation using a value from a first element of the input vector for which corresponding elements of the predicate vector and control vector are active as an address for the read operation (step 500). In attempting to perform the read operation, processor 102 can send a read request using the address to L1 cache 104, L2 cache 106, and/or to another level of the memory hierarchy.

If no fault condition is encountered when attempting to perform the read operation (step 502) (i.e., if no fault condition is encountered when performing a read using the address from the element), processor 102 completes the read operation (step 504). Processor 102 can then store a result of the read operation into the result register (step 506).

If a fault condition is encountered for the element, processor 102 determines if a corresponding element of the control vector is the first active element of the control vector (step 508). When the corresponding element of the control vector is the first active element of the control vector (step 508), processor 102 processes the fault (step 510). For example, if the fault is a page fault, processor 102 can perform operations for processing/handling the page fault. As another example, the address in the element can be an illegal address, and processor 102 can perform operations for processing/handling the corresponding fault.

When the corresponding element of the control vector is not the first active element of the control vector (step 508), processor 102 masks the fault for the element and stores a substitute value into the result register (step 512). When masking the fault, processor 102 can terminate the read operation for the element and/or can ignore any result returned from the read operation and can ignore the fault condition (e.g., not immediately process/handle the fault). When storing the substitute value to the result register, processor 102 can store a given predetermined value (e.g., 0, 1, or "F") to the result register. Processor 102 can then clear corresponding bit positions of FSR 214 to indicate the element for which the fault condition was encountered and masked (step 514). For example, if the fault occurred while using the address from the Nth element of the input vector, processor 102 can clear the Nth bit position of FSR 214 and any subsequent bit positions in FSR 214.

For example, assuming that the input vector inpt (for which exemplary address values are represented using single characters), the control vector ctrl, and the predicate vector pred contain the following values, and that the read of corresponding addresses from the input vector would encounter fault conditions as follows (with Y representing a faulting element and X representing "don't care" elements that are not processed during this instance of the SReadXF instruction), the SReadXF instruction can have the following result:

| On entry: | inpt | = { | A | B | C | D | E | F | G | H | } |
|---|---|---|---|---|---|---|---|---|---|---|---|
|  | ctrl | = { | 0 | 0 | 1 | 1 | 1 | 1 | 1 | 1 | } |
|  | pred | = { | 0 | 0 | 1 | 1 | 1 | 1 | 1 | 1 | } |
|  | fault | = |  X | X | Y | X | X | X | X | X |  |
| Result: | fault processed |

Using the values in this example, when executing the SReadXF instruction, processor 102 performs a read operation using the address from the third element of input (address "C")—which is the first element where both the predicate vector and the control vector are active. Reading the address from the third element results in a fault condition (as shown by the "Y" for the third element). Because the fault occurs for an element of the input vector for which the corresponding element of the control vector is the first active element of the control vector, processor 102 processes the fault. In the described embodiments, when processing the fault, processor 102 may perform one or more operations for handling the fault such as generating an exception, loading pages, terminating the program, etc., depending on the nature of the fault.

As another example, assuming that the input vector inpt (for which exemplary address values are represented using single characters), the control vector ctrl, and the predicate vector pred contain the following values, and that the read of corresponding addresses from the input vector encounter fault conditions as follows (with Y representing a faulting element and X representing "don't care" elements that are not processed during this instance of the SReadXF instruction), the SReadXF instruction can have the following result:

| On entry: | inpt | = { | A | B | C | D | E | F | G | H | } |
|---|---|---|---|---|---|---|---|---|---|---|---|
|  | ctrl | = { | 1 | 1 | 1 | 1 | 1 | 1 | 1 | 1 | } |
|  | pred | = { | 0 | 0 | 1 | 1 | 1 | 1 | 1 | 1 | } |
|  | fault | = |  X | X | Y | X | X | X | X | X |  |
| Result: | fault masked |
| On exit: | res | = SV |

Using the values in this example, when executing the SReadXF instruction, processor 102 performs a read operation using the address from the third element of input (address "C")—which is the first element where both the predicate vector and the control vector are active. Reading the address from the third element results in a fault condition (as shown by the "Y" for the third element). Because the third element of the control vector is not the first active element of the control vector, processor 102 masks the fault. When masking the fault, processor 102 can simply can terminate the read operation for the element and/or can ignore any result returned from the read operation, can ignore the fault condition, and proceed with subsequent operations. For example, if the fault is a page fault, processor 102 may not load a page from disk to memory. Processor 102 can also write a predetermined substitute value (represented by "SV" above, but which can be any suitable predetermined value, e.g., 0, 99, Z, etc.) to the result register. Next, processor 102 can clear one or more bits in FSR 214 to indicate that the fault was masked for the element.

In some embodiments, processor 102 sets one or more processor status flags or otherwise updates one or more processor memories/indicators to indicate that faults have been masked (or not). For example, processor 102 can set a "none" flag to indicate that no faults were masked.

As yet another example, assuming that the input vector inpt (for which exemplary address values are represented using single characters), the control vector ctrl, and the predicate vector pred contain the following values, and that the read of corresponding addresses from the input vector encounter fault conditions as follows (with N representing a non-faulting element and X representing "don't care" elements that are not processed during this instance of the SReadXF instruction), the SReadXF instruction can have the following result:

| On entry: | inpt | = { | A | B | C | D | E | F | G | H | } |
|---|---|---|---|---|---|---|---|---|---|---|---|
|  | ctrl | = { | 1 | 1 | 1 | 1 | 1 | 1 | 1 | 1 | } |
|  | pred | = { | 0 | 0 | 1 | 1 | 1 | 1 | 1 | 1 | } |
|  | fault | = |  X | X | N | X | X | X | X | X |  |
| On exit: | res | = Mem[C] |

Using the values in this example, when executing the SReadXF instruction, processor 102 performs a read operation using the address from the third element of input (address "C")—which is the first element where both the predicate vector and the control vector are active. Reading the address from the third element does not result in a fault condition (as shown by the "N" for the third element). Processor 102 therefore proceeds with the read operation normally. For example, processor 102 can eventually receive a result of the read operation from L1 cache 102 or another portion of the memory hierarchy, and can store the result (which is represented by "Mem[ ]" above) from the read operation into the result register.

Figure 6:
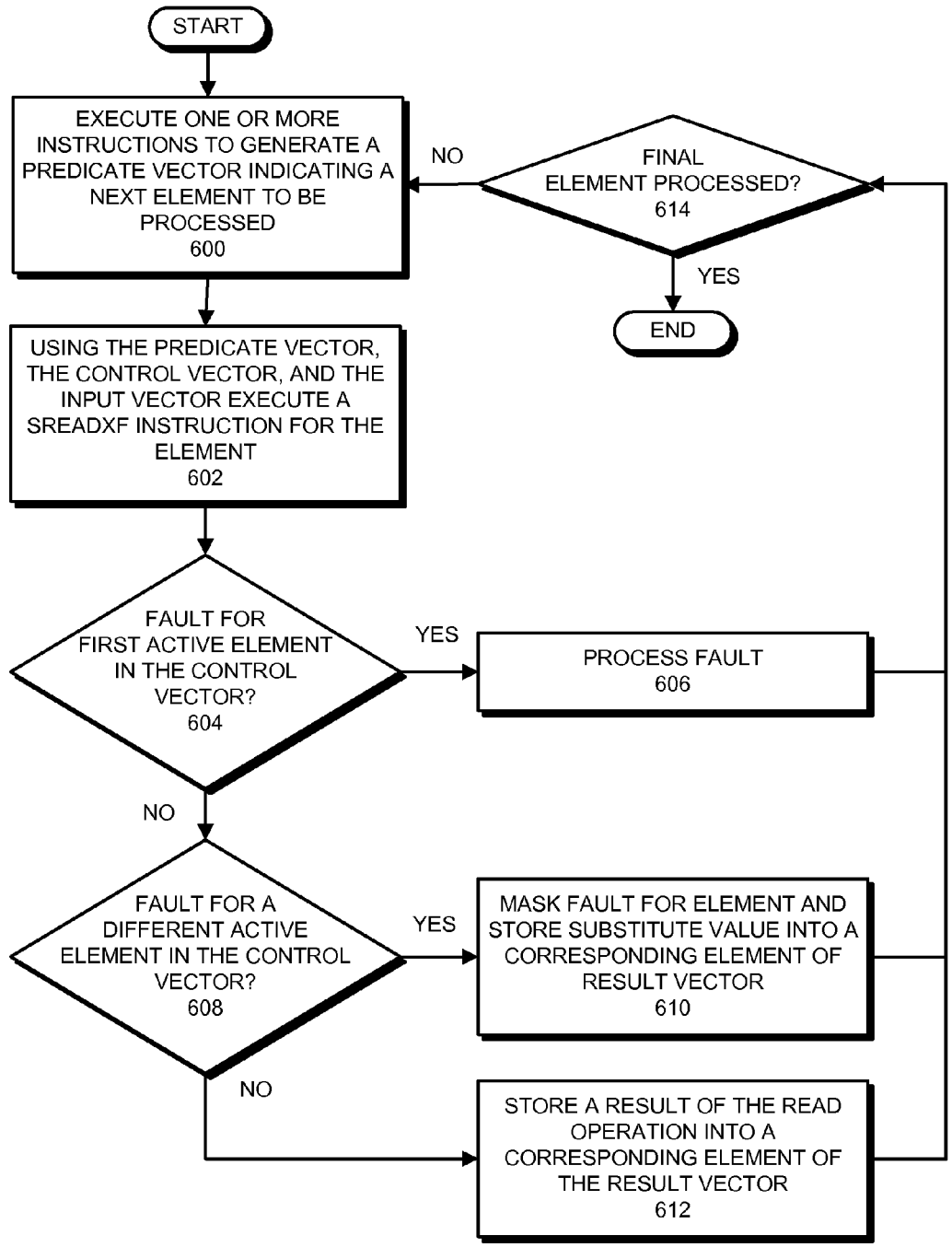
FIG. 6 presents a flowchart illustrating using a SReadXF instruction while executing program code in accordance with the described embodiments.

FIG. 6 presents a flowchart illustrating using an SReadXF instruction while executing program code in accordance with the described embodiments. As described above, the SReadXF instruction attempts to perform a read operation using a value from a first element of the input vector for which both the corresponding element of the control vector and corresponding element of the predicate vector are active as an address for the read operation. Thus, a single element of the input vector is processed during a given iteration of the SReadXF instruction. In FIG. 6, an example is presented where processor 102 can execute the SReadXF instruction multiple times to process multiple elements of the input vector.

For the example in FIG. 6, the input vector and the control vector are assumed to have been received by processor 102. In addition, the control vector is assumed to have been set to indicate a subset of the elements of the input vector for which read operations are to be performed using the SReadXF instruction. For example, if read operations are to be performed for the second through seventh elements of the input vector, the control vector, "ctrl," can be set as follows:

ctrl={01111110}

In the example in FIG. 6, the predicate vector is updated before each iteration of the SReadXF instruction to enable the determination of which of the subset of elements are to be read during the iteration. In this way, processor 102 can proceed through the subset of elements of the input vector, using the value in each one in turn as the address for the read operation performed for the SReadXF instruction.

The process shown in FIG. 6 starts when processor 102 executes one or more instructions to generate a predicate vector indicating a next element to be processed (step 600). Generally, the one or more instructions are configured so that the predicate vector generated by processor 102 includes an active element that indicates a next one of the subset of the elements from the input vector from which processor 102 is to use a value as an address for performing the read operation. As processor 102 performs the operations in FIG. 6, the predicate-generation operation can be performed up to six times (and should be performed six times, absent encountering a fault condition for one of the reads). The following illustrates one example of this operation using the control vector shown above (for passes 1-6, or "p1" to "p6," where "p3"–"p4" are not shown for clarity), assuming no fault condition is encountered:

|     | ctrl | = { | 0 | 1 | 1 | 1 | 1 | 1 | 1 | 0 | } |
|-----|------|-----|---|---|---|---|---|---|---|---|---|
| p1: | pred | = { | 0 | 1 | 1 | 1 | 1 | 1 | 1 | 0 | } |
| p2: | pred | = { | 0 | 0 | 1 | 1 | 1 | 1 | 1 | 0 | } |
| ... |      |     |   |   |   |   |   |   |   |   |   |
| p5: | pred | = { | 0 | 0 | 0 | 0 | 0 | 1 | 1 | 0 | } |
| p6: | pred | = { | 0 | 0 | 0 | 0 | 0 | 0 | 1 | 0 | } |

As can be seen, for each pass of the predicate-generating instructions, a first (leftmost, in this example) element of the predicate vector is set one element further to the right, which causes processor 102 to perform a read for a next element to the right each time the SReadXF instruction is executed following the generation of the predicate vector.

In the described embodiments, the one or more instructions for generating a predicate vector can comprise any instructions suitable for generating (or enabling generating) predicates. These instructions are not herein described, but some exemplary instructions are described in the '063 and '546 applications. Note that, in some embodiments, the predicate vector may be set differently (e.g., only one element may be active in a given pass), however, the predicate vector should generally indicate a next one of the elements from the input vector from which processor 102 is to use a value as an address for performing a read operation.

Processor 102 next uses the generated predicate vector, the control vector, and the input vector to execute a SReadXF instruction for the element (step 602). When a fault condition is encountered during for the read operation using the value from an element in the input vector at a same position as the first active element of the control vector (step 604), processor 102 processes the fault as described above in step 512 (step 606).

When a fault condition is encountered during for the read operation using the value from an element in the input vector any position other than element at the same position the first active element of the control vector (step 608), processor 102 masks the fault for the element and stores a substitute value into a corresponding element of the result vector (step 610). If no fault condition is encountered, processor 102 stores a result of the read operation into a corresponding element of the result vector (step 612).

Next, from any of step 606, 610, or 612, processor 102 determines if the final element has been processed (step 614). More specifically, processor 102 determines if a read operation has been performed (using the SReadXF instruction) for each element of the subset of elements indicated by the control vector. If not (i.e., if elements remain to be processed), processor 102 returns to step 600. Otherwise, the process ends.

The foregoing descriptions have been presented only for purposes of illustration and description. They are not intended to be exhaustive or to limit the described embodiments to the forms disclosed. Accordingly, many modifications and variations will be apparent to practitioners skilled in the art. Additionally, the above disclosure is not intended to limit the described embodiments. The scope of these embodiments is defined by the appended claims.

What is claimed is:

1. A method for handling faults in a processor, comprising:
receiving an input vector, a control vector, and a predicate vector, each vector comprising a plurality of elements;
for a first element of the input vector for which corresponding elements of the control vector and the predicate vector are active, performing a scalar read operation using an address from the element of the input vector; and
when a fault condition is encountered while performing the read operation, determining if the corresponding element of the control vector is the first active element of the control vector; and
if so, processing the fault;
otherwise, masking the fault.

2. The method of claim 1, wherein masking the fault comprises ignoring the fault condition that was encountered while performing the read operation using the address from the element.

3. The method of claim 1, wherein the method further comprises: when the fault is masked, storing a substitute value into a result register; and
when no fault condition is encountered while performing the read operation, storing a result of the read operation into the result register.

4. The method of claim 1, wherein masking the fault comprises clearing at least one corresponding bit position in a fault-status register (FSR) to indicate that the fault was masked.

5. The method of claim 4, wherein clearing at least one corresponding bit position in the FSR comprises:
   clearing bit positions at and after a corresponding bit position in the FSR.

6. The method of claim 1, wherein the method further comprises:
   when a fault has been masked, setting a processor status flag to indicate that the fault has been masked.

7. The method of claim 1, wherein the input vector comprises one of an address or an address pointer in each element.

8. The method of claim 1, wherein processing the fault comprises generating an exception.

9. A processor that handles faults, comprising:
   an execution unit configured to:
      receive an input vector, a control vector, and a predicate vector, each vector comprising a plurality of elements;
      for a first element of the input vector for which corresponding elements of the control vector and the predicate vector are active, perform a scalar read operation using an address from the element of the input vector; and
      when a fault condition is encountered while performing the read operation, determine if the corresponding element of the control vector is the first active element of the control vector; and
      if so, process the fault;
      otherwise, mask the fault.

10. The processor of claim 9, wherein, when masking the fault, the execution unit is configured to ignore the fault condition that was encountered while performing the read operation using the address from the element.

11. The processor of claim 9, wherein
   when the fault is masked, the execution unit is configured to store a substitute value into a result register; and
   when no fault condition is encountered while performing the read operation, the execution unit is configured to store a result of the read operation into the result register.

12. The processor of claim 9, wherein, when masking the fault, the execution unit is configured to clear at least one corresponding bit position in a fault-status register (FSR) to indicate that the fault was masked.

13. The processor of claim 12, wherein, when clearing at least one corresponding bit position in the FSR, the execution unit is configured to:
   clear bit positions at and after a corresponding bit position in the FSR.

14. The processor of claim 9, wherein, when a fault has been masked, the execution unit is configured to set a processor status flag to indicate that the fault has been masked.

15. The processor of claim 9, wherein the input vector comprises one of an address or an address pointer in each element.

16. The processor of claim 9, wherein, when processing the fault, the execution unit is configured to generate an exception.

17. An electronic device that handles faults, comprising:
   a processor;
   a memory coupled to the processor that stores instructions and data for the processor;
   an execution unit in the processor, wherein the execution unit is configured to:
      receive an input vector, a control vector, and a predicate vector, each vector comprising a plurality of elements;
   for a first element of the input vector for which corresponding elements of the control vector and the predicate vector are active, perform a scalar read operation using an address from the element of the input vector; and
   when a fault condition is encountered while performing the read operation, determine if the corresponding element of the control vector is the first active element of the control vector; and
   if so, process the fault;
   otherwise, mask the fault.

18. The electronic device of claim 17, wherein, when masking the fault, the execution unit is configured to ignore the fault condition that was encountered while performing the read operation using the address from the element.

19. The electronic device of claim 17, wherein
   when the fault is masked, the execution unit is configured to store a substitute value into a result register; and
   when no fault condition is encountered while performing the read operation, the execution unit is configured to store a result of the read operation into the result register.

20. The electronic device of claim 17, wherein, when masking the fault, the execution unit is configured to clear at least one corresponding bit position in a fault-status register (FSR) to indicate that the fault was masked.

21. The electronic device of claim 20, wherein, when clearing at least one corresponding bit position in the FSR, the execution unit is configured to:
   clear bit positions at and after a corresponding bit position in the FSR.

22. The electronic device of claim 17, wherein, when a fault has been masked, the execution unit is configured to set a processor status flag to indicate that the fault has been masked.

23. The electronic device of claim 17, wherein the input vector comprises one of an address or an address pointer in each element.

24. The electronic device of claim 17, wherein, when processing the fault, the execution unit is configured to generate an exception.

* * * * *